US011580663B2

(12) United States Patent
Kanetake et al.

(10) Patent No.: US 11,580,663 B2
(45) Date of Patent: Feb. 14, 2023

(54) CAMERA HEIGHT CALCULATION METHOD AND IMAGE PROCESSING APPARATUS

(71) Applicant: FUJITSU LIMITED, Kawasaki (JP)

(72) Inventors: Jun Kanetake, Kawasaki (JP); Rie Hasada, Tama (JP); Haruyuki Ishida, Kawasaki (JP); Takushi Fujita, Chigasaki (JP)

(73) Assignee: FUJITSU LIMITED, Kawasaki (JP)

( * ) Notice: Subject to any disclaimer, the term of this patent is extended or adjusted under 35 U.S.C. 154(b) by 92 days.

(21) Appl. No.: 17/191,263

(22) Filed: Mar. 3, 2021

(65) Prior Publication Data
US 2021/0335000 A1 Oct. 28, 2021

(30) Foreign Application Priority Data

Apr. 27, 2020 (JP) .............................. JP2020-078225

(51) Int. Cl.
G06T 7/73 (2017.01)
G06V 20/56 (2022.01)
G06V 10/44 (2022.01)

(52) U.S. Cl.
CPC ................ G06T 7/73 (2017.01); G06V 10/44 (2022.01); G06V 20/56 (2022.01); G06T 2207/30252 (2013.01)

(58) Field of Classification Search
CPC .... G06T 7/70; G06T 7/73; G06T 7/80; G06T 2207/30244; G06T 2207/30252; G06V 10/44; G06V 20/56; G06V 20/588
See application file for complete search history.

(56) References Cited

U.S. PATENT DOCUMENTS

| 2006/0078197 | A1  | 4/2006  | Mitsumoto et al. |
| 2014/0294246 | A1* | 10/2014 | Osamura ................. G07C 5/00 |
|              |     |         | 382/107 |
| 2017/0076459 | A1* | 3/2017  | Plowman ............... G06V 10/44 |
| 2017/0262735 | A1  | 9/2017  | Ros Sanchez et al. |
| 2018/0189576 | A1  | 7/2018  | Joshi et al. |
| 2020/0336670 | A1* | 10/2020 | Fu et al. .................... G06T 7/70 |

FOREIGN PATENT DOCUMENTS

| JP | 2005-195421 A | 7/2005 |
| JP | 2006-105661 A | 4/2006 |
| JP | 2017-162456 A | 9/2017 |
| JP | 2020-035158 A | 3/2020 |
| JP | 2020-060899 A | 4/2020 |

OTHER PUBLICATIONS

EPO translation of JP 2020-60899 A (Year: 2020).*
EPO translation of JP 2020-35158 A (Year: 2020).*
Extended European Search Report, from the European Patent Office in counterpart European Application No. 21159208.4, dated Jul. 30, 2021.

* cited by examiner

Primary Examiner — Andrew W Johns
(74) Attorney, Agent, or Firm — ArentFox Schiff LLP

(57) ABSTRACT

A camera height calculation method that causes a computer to execute a process, the process includes obtaining one or more images captured by an in-vehicle camera, extracting one or more feature points from the one or more images, identifying first feature points that exist over a road surface from the one or more feature points, and calculating a height of the in-vehicle camera from the road surface, based on positions of the identified first feature points.

9 Claims, 15 Drawing Sheets

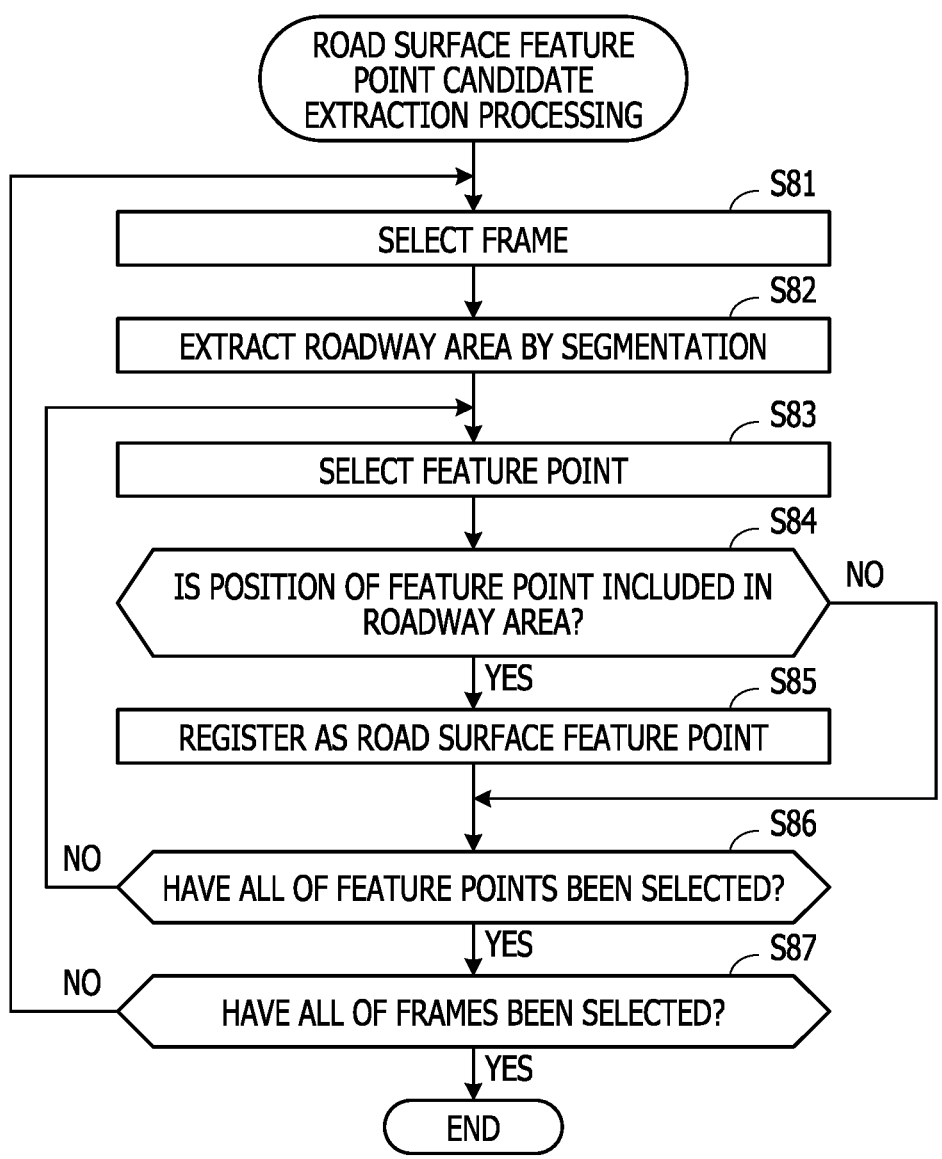

CAMERA HEIGHT CALCULATION METHOD AND IMAGE PROCESSING APPARATUS

CROSS-REFERENCE TO RELATED APPLICATION

This application is based upon and claims the benefit of priority of the prior Japanese Patent Application No. 2020-78225, filed on Apr. 27, 2020, the entire contents of which are incorporated herein by reference.

FIELD

The embodiments discussed herein are related to a camera height calculation method and an image processing apparatus.

BACKGROUND

In recent years, driving recorders that capture and record images of the front and rear of a vehicle have been widely spread. The images recorded by such a driving recorder is useful, for example, for keeping circumstances before and after occurrence of an accident as evidence and for analyzing conditions of an accident.

Technologies have been developed that recognize various objects from the images and estimate positions or forms of the objects. For example, a plane estimation method has been proposed which, based on three-dimensional coordinates of feature points extracted from a stereo image, detects an image similar to the image at each feature point position from images before and after a movement of an object and calculates a three-dimensional position of a plane on which the object moves from three-dimensional movement vectors of the feature points. As a technology applying semantic segmentation as an image recognition technology, a computer system has been proposed in which a source deconvolution network is adaptively trained to execute semantic segmentation.

Related techniques are disclosed in, for example, Japanese Laid-open Patent Publication No. 2006-105661 and Japanese Laid-open Patent Publication No. 2017-162456.

SUMMARY

According to an aspect of the embodiments, a camera height calculation method that causes a computer to execute a process, the process includes obtaining one or more images captured by an in-vehicle camera, extracting one or more feature points from the one or more images, identifying first feature points that exist over a road surface from the one or more feature points, and calculating a height of the in-vehicle camera from the road surface, based on positions of the identified first feature points.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 15 is an example of a flowchart illustrating road surface feature point candidate extraction processing according to a modification example.

DESCRIPTION OF EMBODIMENTS

There is a demand for analyzing an image captured by an in-vehicle camera such as a camera in a driving recorder and calculating a distance to an object included in the image. For example, when a crash into an object occurs, estimation of a distance to the object or a speed of the object from an image before the occurrence of the crash may be desirable.

In order to calculate such a distance to an object from an image, an accurate height of the in-vehicle camera from a road surface may be desired. However, to do so, an accurate height of the in-vehicle camera from a road surface is to be measured in advance.

Hereinafter, embodiments of a technology that may calculate a height of an in-vehicle camera from a road surface based on a captured image will be described with reference to drawings.

First Embodiment

Figure 1:
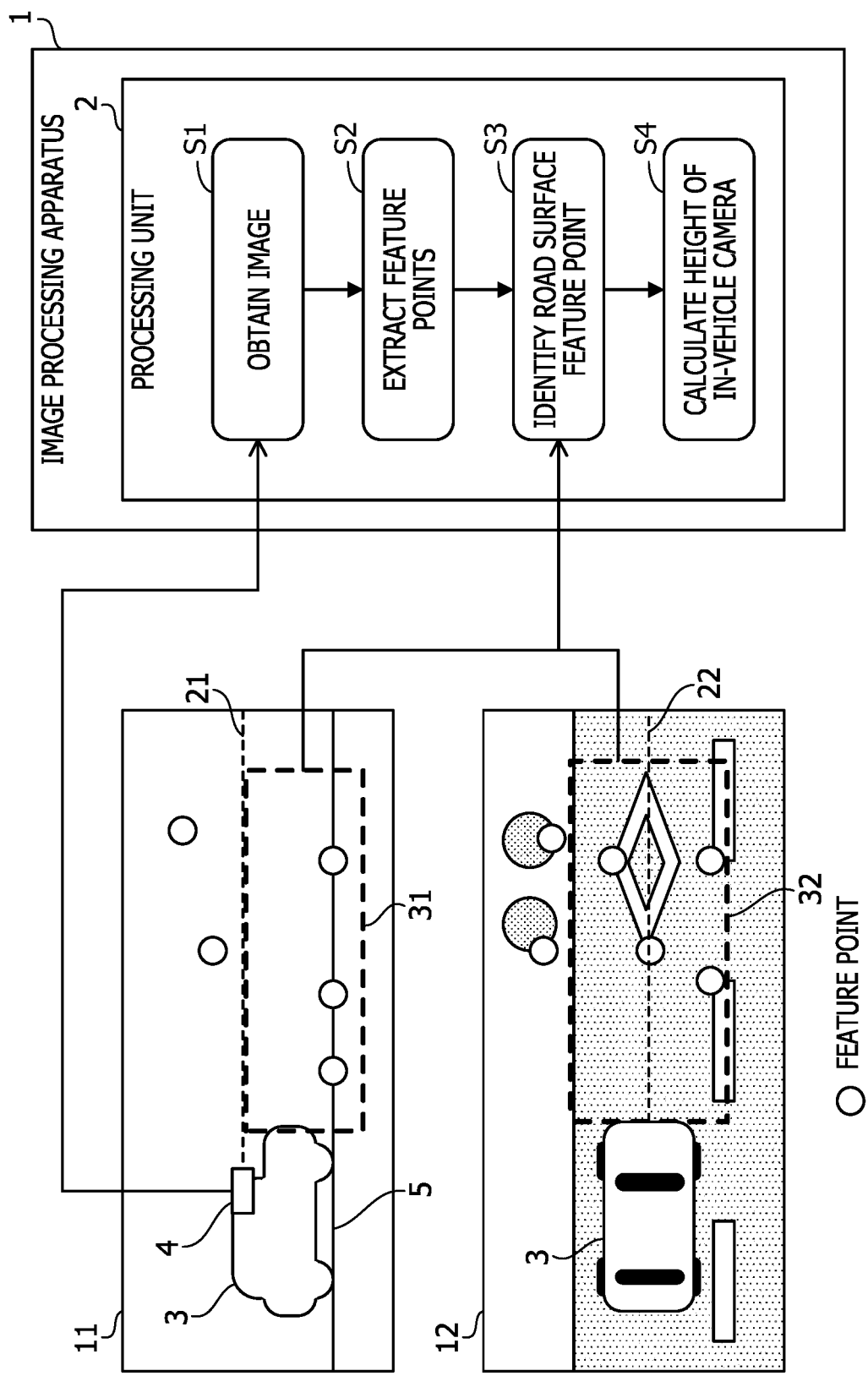
FIG. 1 is a diagram illustrating a configuration example and a processing example of an image processing apparatus according to a first embodiment.

FIG. 1 is a diagram illustrating a configuration example and a processing example of an image processing apparatus according to a first embodiment. An image processing apparatus 1 illustrated in FIG. 1 calculates a height of a camera (in-vehicle camera) 4 mounted in a vehicle 3 from a road surface 5 based on an image captured by the camera 4. The image processing apparatus 1 has a processing unit 2. The processing unit 2 is implemented by a processor, for example. The processing unit 2 executes following processing.

The processing unit 2 obtains an image captured by the camera 4 [operation S1]. Next, the processing unit 2 extracts feature points from the obtained image [operation S2]. Next, the processing unit 2 identifies road surface feature points that exist over the road surface 5 from among the extracted feature points [operation S3].

FIG. 1 exemplarily illustrates driving scenes 11 and 12 of the vehicle 3. The driving scene 11 corresponds to a case where an area in which the vehicle 3 is running is viewed from a lateral direction, and the driving scene 12 corresponds to a case where the area in which the vehicle 3 is running is viewed from an upper direction. In both of the driving scenes 11 and 12, the vehicle 3 runs from left to right in FIG. 1, and the camera 4 captures images in the direction of running.

By using simultaneous localization and mapping (SLAM) technology, for example, the processing unit 2 may calculate three-dimensional coordinates of each feature point in a three-dimensional coordinate system with reference to a position of the camera 4 based on a plurality of images captured by the camera 4 as the vehicle 3 moves. In this case, the processing unit 2 may identify road surface feature points from among extracted feature points based on positional relationships between the camera 4 and the feature points in the three-dimensional coordinate system.

For example, referring to the driving scene 11, it may be considered that the road surface 5 exists at a lower position than a direction of capturing (optical axis) 21 of the camera 4. Accordingly, the processing unit 2 may estimate that there is a high possibility that the feature points included in a predetermined range 31 in a lower direction from a horizontal plane along the direction of capturing 21 exist over the road surface 5 in the three-dimensional coordinate system. Conversely, the processing unit 2 may estimate that there is a high possibility that the feature points not included in the range 31 have been extracted from areas, such as a traffic signal and a sign, other than the road surface 5.

Referring to the driving scene 12, since the vehicle 3 runs over a road, it may be considered that an area having a predetermined width about a direction of running 22 of the vehicle 3 is the road surface 5 of the road. Accordingly, the processing unit 2 may estimate that there is a high possibility that the feature points included in a predetermined distance range 32 in a right-left direction from a vertical plane along the direction of running 22 exist over the road surface 5 in the three-dimensional coordinate system. Conversely, the processing unit 2 may estimate that there is a high possibility that the feature points not included in the range 32 have been extracted from areas, such as an object over a sidewalk along the road, other than the road surface 5.

Therefore, in operation S3, the processing unit 2 may identify a feature point at a position included in both of the range 31 and the range 32 in the three-dimensional coordinate system as a road surface feature point from among the feature points extracted in operation S2, for example.

The processing unit 2 may also identify a road surface feature point based on two-dimensional coordinates on an image, instead of three-dimensional coordinates of the extracted feature points. For example, the processing unit 2 may extract an area of the road surface 5 by image recognition from a captured image and identify a feature point included in the area of the road surface 5 as a road surface feature point from among feature points included in the image.

Next, the processing unit 2 calculates a height of the camera 4 from the road surface 5 based on the position of the identified road surface feature point [operation S4]. For example, the processing unit 2 calculates a height of the camera 4 based on relative positions of the camera 4 and the road surface feature point in the three-dimensional coordinate system.

Through the processing above, the image processing apparatus 1 may calculate a height of the camera 4 from an image captured by the camera 4. Therefore, a height of the camera 4 may be acquired without measuring the height of the camera 4 in advance.

Second Embodiment

Next, according to a second embodiment, an image processing system will be described which may calculate a height of a camera installed in a driving recorder from a captured image.

Figure 2:
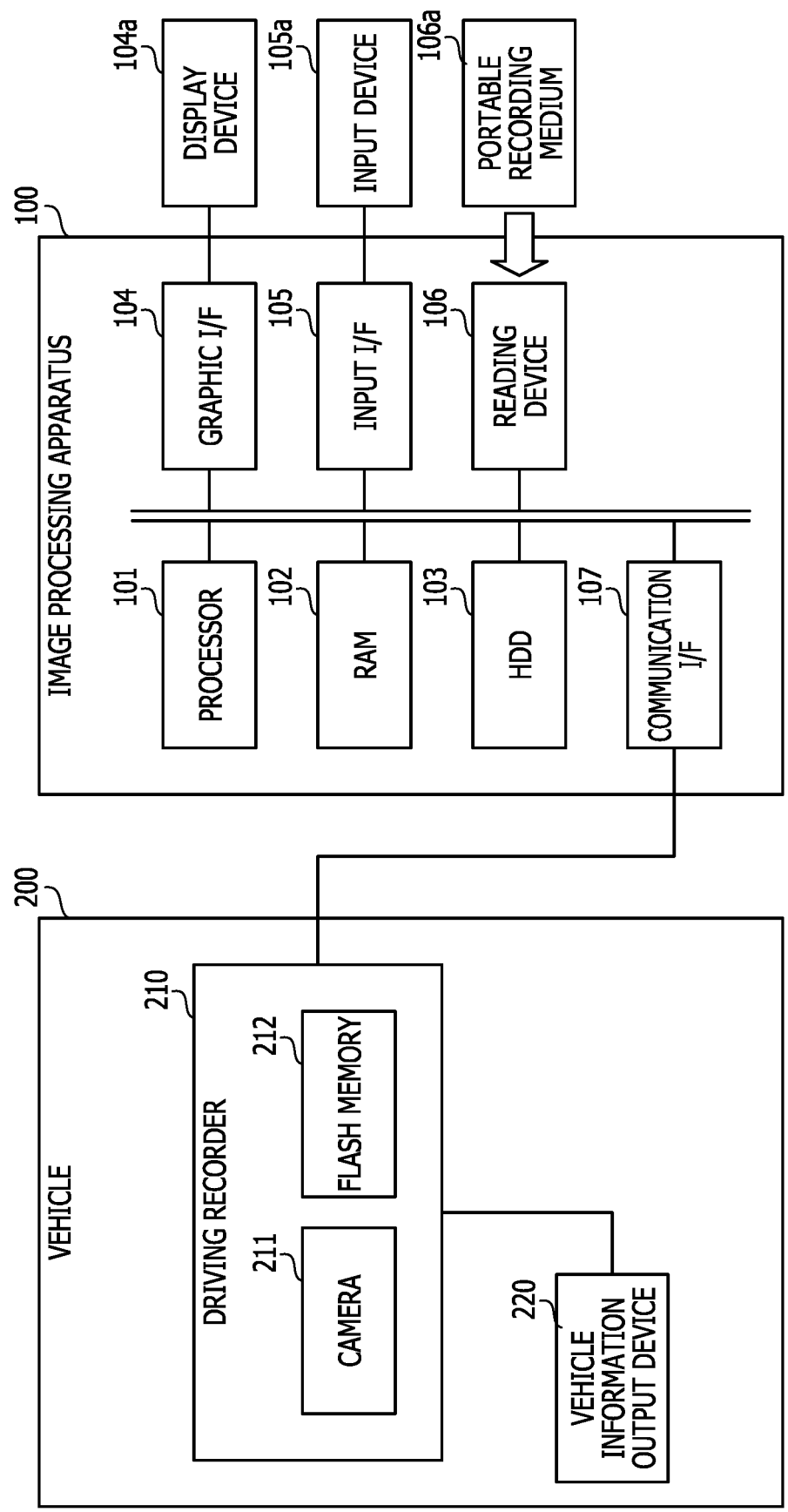
FIG. 2 is a diagram illustrating a configuration example of an image processing system according to a second embodiment.

FIG. 2 is a diagram illustrating a configuration example of an image processing system according to the second embodiment. As illustrated in FIG. 2, the image processing system includes an image processing apparatus 100 and a driving recorder 210. The driving recorder 210 is mounted in a vehicle 200 and includes a camera 211 and a flash memory 212. The camera 211 captures images in a travelling direction of the vehicle 200, and the captured images are encoded by a predetermined encoding method and are stored in the flash memory 212 as moving image data. The driving recorder 210 receives vehicle information for calculating a movement distance of the vehicle 200 from a vehicle information output device 220 mounted in the vehicle 200. As the vehicle information, for example, a measurement value of a position of the vehicle 200 (such as positional information by a Global Positioning System (GPS), a measurement value of a vehicle speed or vehicle speed pulses according to the vehicle speed, for example) is received. The vehicle information output device 220 is implemented as, for example, an electronic control unit (ECU). The driving recorder 210 outputs moving image data and vehicle information on each frame of the moving image data to the image processing apparatus 100.

The image processing apparatus 100 obtains the moving image data and the vehicle information from the driving recorder 210. Although, according to this embodiment, the image processing apparatus 100 receives those kinds of information from the driving recorder 210 by communication as an example, those kinds of information may be obtained through, for example, a portable recording medium. By using the obtained information, the image processing apparatus 100 calculates a height of the camera 211 in the driving recorder 210 from a road surface. Based on the captured images and the calculated height of the camera 211, the image processing apparatus 100 may also estimate a distance to an object over the road surface in the images.

The image processing apparatus 100 is implemented as, for example, a personal computer or a server computer. In this case, the image processing apparatus 100 includes, as illustrated in FIG. 2, a processor 101, a random-access memory (RAM) 102, a hard disk drive (HDD) 103, a graphic interface (I/F) 104, an input interface (I/F) 105, a reading device 106, and a communication interface (I/F) 107.

The processor 101 centrally controls the entire image processing apparatus 100. The processor 101 is, for example, a central processing unit (CPU), a microprocessor unit (MPU), a digital signal processor (DSP), an application-specific integrated circuit (ASIC), or a programmable logic device (PLD). The processor 101 may also be a combination of two or more elements of the CPU, the MPU, the DSP, the ASIC, and the PLD.

The RAM 102 is used as a main storage device of the image processing apparatus 100. The RAM 102 temporarily stores at least part of an operating system (OS) program and an application program to be executed by the processor 101. Various kinds of data to be used in processing by the processor 101 are also stored in the RAM 102.

The HDD 103 is used as an auxiliary storage device of the image processing apparatus 100. The OS program, the application program, and various kinds of data are stored in the HDD 103. A different type of nonvolatile storage device such as a solid-state drive (SSD) (OS) may be used as the auxiliary storage device.

A display device 104a is coupled to the graphic interface 104. The graphic interface 104 displays an image on the display device 104a according to a command from the processor 101. Examples of the display device include a liquid crystal display and an organic electroluminescence (EL) display.

An input device 105a is coupled to the input interface 105. The input interface 105 transmits a signal output from the input device 105a to the processor 101. Examples of the input device 105a include a keyboard and a pointing device. Examples of the pointing device include a mouse, a touch panel, a tablet, a touch pad, and a track ball.

A portable recording medium 106a is removably attached to the reading device 106. The reading device 106 reads data recorded in the portable recording medium 106a and transmits the data to the processor 101. Examples of the portable recording medium 106a include an optical disk, a magneto-optical disk, and a semiconductor memory.

The communication interface 107 transmits and receives data to and from other apparatuses via, for example, a network, not illustrated. According to this embodiment, the moving image data and vehicle information transmitted from the driving recorder 210 are received by the communication interface 107.

The processing functions of the image processing apparatus 100 may be realized by the hardware configuration as described above.

It may be considered that images captured by the driving recorder are utilized for various applications. For example, when an accident occurs, there is a request for grasping circumstances of the accident accurately as much as possible by analyzing the captured images. Recently, a service has been started in which an automobile insurance company obtains images from a driving recorder of a customer and checks circumstances of an accident.

Figure 3:
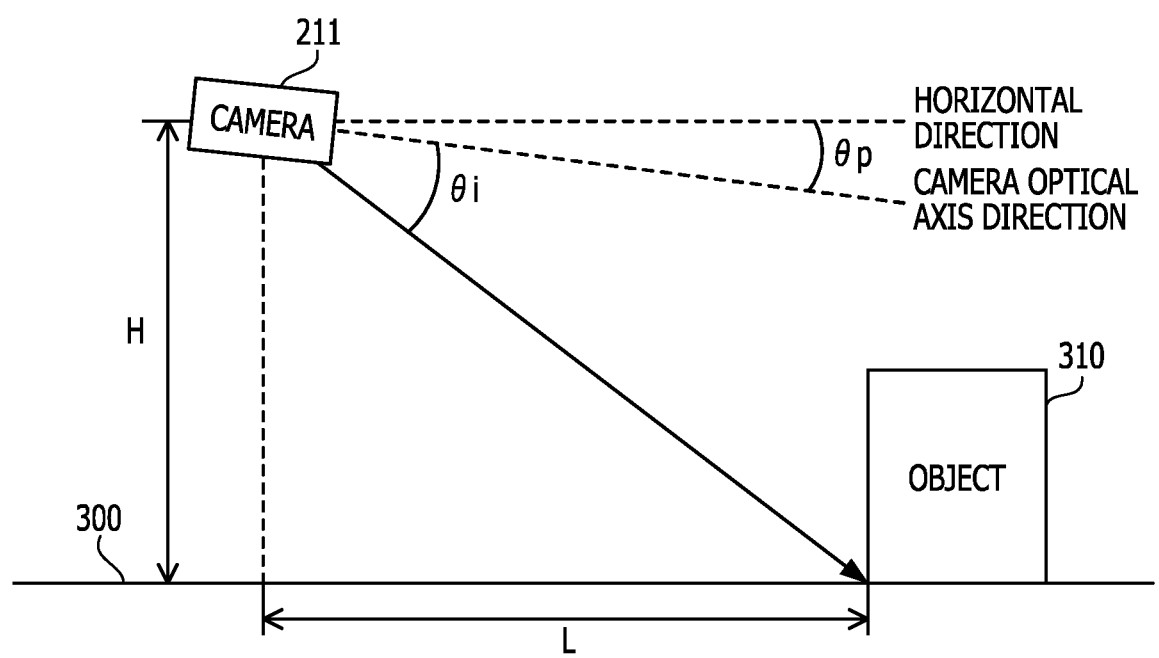
FIG. 3 is a diagram illustrating an example of a method for using an image captured by a driving recorder.

FIG. 3 is a diagram illustrating an example of a method for using an image captured by the driving recorder. FIG. 3 illustrates an example in which, in a circumstance where an object 310 exists over a road surface 300, a distance L along the road surface 300 between the vehicle 200 (the camera 211 in reality) and the object 310 is calculated based on an image including the object 310 captured by the camera 211. For example, in a case where the object 310 is another vehicle or an obstacle and an accident that the vehicle 200 crashes into the object 310 occurs, a position or a speed of the object 310 may be estimated by calculating the distance L by using an image before the crash. The distance L may be calculated by the following Expression (1).

$$L = H/\tan(\theta p + \theta i) \tag{1}$$

where $\theta p$ is an angle of an optical axis direction of the camera 211 with respect to a horizontal direction, and $\theta i$ is an angle between the optical axis direction and a direction from the camera 211 to a lower end of the object 310 (angle in a vertical direction). H is a height of the camera 211 from the road surface 300. In this case, the road surface 300 is assumed to be horizontal.

In order to calculate the distance L by using Expression (1), the height H of the camera 211 is to be acquired in advance. However, generally, it is not easy for a user to acquire the accurate attached height of the driving recorder 210. For example, in a case where the driving recorder 210 is retrofitted, a user may just visually check whether the camera 211 directs substantially to the front when the user mounts the driving recorder 210 in the vehicle 200 and may not accurately measure the height or the direction of image capturing of the driving recorder 210. Since the driving recorder 210 may be displaced or come off due to impact of a traffic accident, it may be impossible to measure the attached height of the driving recorder 210 after the accident.

Against such a problem. the image processing apparatus 100 according to this embodiment estimates a height H of the camera 211 by using an image captured by the camera 211. In this estimation processing, the image processing apparatus 100 identifies a feature (feature points corresponding to a white line, road-surface paint, a crack or the like (hereinafter, called "road surface feature point")) existing over the road surface 300 from among feature points extracted from the image. The image processing apparatus 100 calculates the height H of the camera 211 based on a three-dimensional position of the identified road surface feature point.

Figure 4:
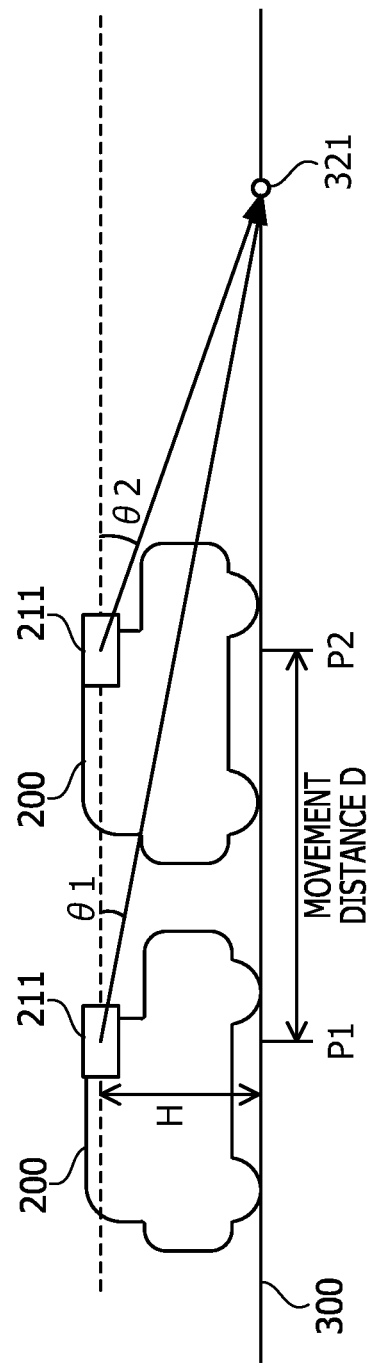
FIG. 4 is a diagram illustrating an example of a positional relationship between a camera in a real space and a road surface feature point.

FIG. 4 is a diagram illustrating an example of a positional relationship between the camera in a real space and a road surface feature point. For easy illustration in FIG. 4, it is assumed that the optical axis direction (direction of image capturing) of the camera 211 is horizontal.

It is assumed that the vehicle 200 has moved by a movement distance D from a position P1 to a position P2. It is further assumed that a road surface feature point 321 exists over the road surface 300. An angle θ1 is formed between a direction from the camera 211 at the position P1 to the road surface feature point 321 and the optical axis direction of the camera 211. An angle θ2 is formed between a direction from the camera 211 at the position P2 to the road surface feature point 321 and the optical axis direction of the camera 211. However, it is assumed that the angles θ1 and θ2 have positive values in a lower direction with respect to the optical axis direction. In this case, a height H of the camera 211 from the road surface 300 is expressed by the following Expression (2).

$$H = D*\tan \theta 1 * \tan \theta 2/(\tan \theta 2 - \tan \theta 1) \tag{2}$$

For example, in a case where the road surface feature point 321 is included in a captured image, three-dimensional coordinates of the road surface feature point 321 in a relative coordinate system about the camera 211 are acquired by SLAM. Since the angles θ1 and θ2 may be acquired from the three-dimensional coordinates, the height H of the camera 211 may be acquired from the angles θ1 and θ2 and the movement distance D based on Expression (2). If the road surface feature point 321 may be detected from a captured image as in this example, the height H of the camera 211 from the road surface 300 may be calculated.

Figure 5A:
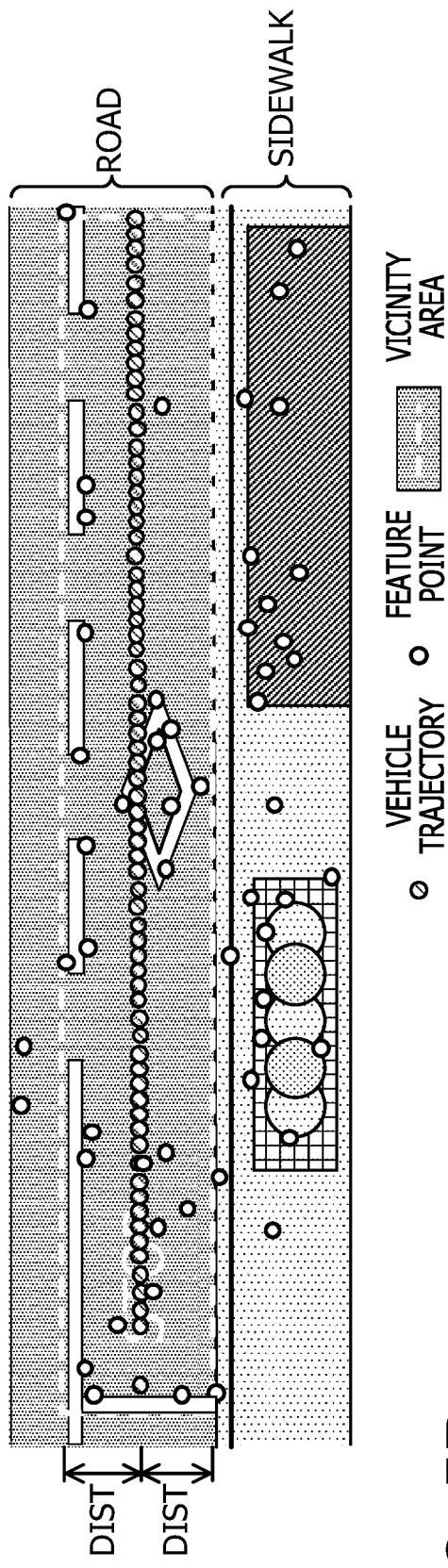
FIGS. 5A and 5B are diagrams illustrating an outline of processing for identifying a road surface feature point.
Figure 5B:
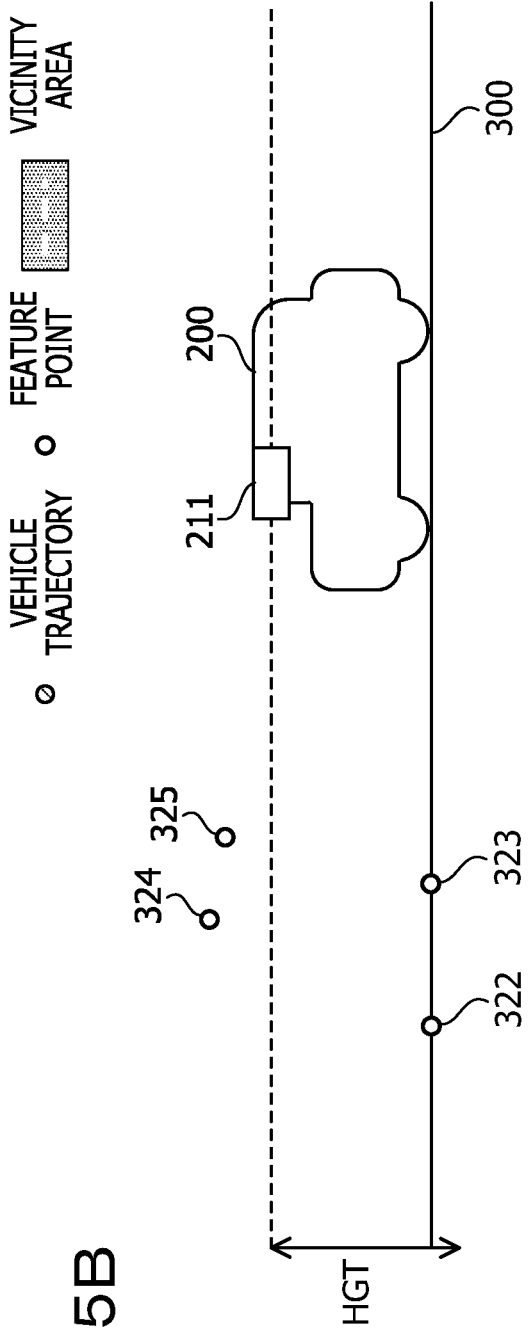

FIGS. 5A and 5B are diagrams illustrating an outline of the processing for identifying a road surface feature point. It is estimated that the road surface 300 exists in a range having a predetermined width about the vehicle 200 and exists at a position lower than the camera 211. Accordingly, based on such a relationship, the image processing apparatus 100 identifies a road surface feature point from among feature points extracted from a captured image.

For example, FIG. 5A illustrates an area where the vehicle 200 has moved, which is viewed from an upper direction. It is assumed that the vehicle 200 has moved from the right direction to the left direction in FIG. 5A. A vehicle trajectory illustrated in FIG. 5A represents a driving trajectory of the vehicle 200 over a horizontal plane in a three-dimensional coordinate system with reference to the camera 211, and each of points included therein represents an image-capturing position of a frame. Feature points illustrated in FIG. 5A are feature points extracted from a captured image. As illustrated in FIG. 5A, the feature points may be extracted not only from a road but also from a sidewalk.

Since the vehicle 200 runs over the road surface 300 of the road, it may be considered that the range of the road surface 300 is included in a predetermined range about the camera 211 mounted in the vehicle 200. Accordingly, from the extracted feature points, the image processing apparatus 100 excludes a feature point having a coordinate in the horizontal direction not included in a range at a predetermined distance DIST from the coordinate of the camera 211 from road surface feature point candidates. Thus, a feature point not included in the range of the road may be excluded with high precision.

FIG. 5B illustrates an area where the vehicle 200 has moved, which is viewed from a lateral direction. Like FIG. 5A, it is assumed that the vehicle 200 has moved from the right direction to the left direction in FIG. 5B. As an example, feature points 322 to 325 are extracted from an image captured by the camera 211 in FIG. 5B.

Considering that the optical axis of the camera 211 is along the horizontal direction, it may be considered that a road surface feature point exists at a position lower than the position in the vertical direction of the camera 211 in the three-dimensional coordinate system and exists within a predetermined range in a lower direction from the position of the camera 211. Accordingly, from the extracted feature points, the image processing apparatus 100 excludes a feature point not included in the range of a height HGT in a lower direction from the position in the vertical direction of the camera 211 from road surface feature point candidates.

Thus, a feature point at a height clearly different from the height of the road surface 300 estimated from the height of the camera 211, such as a feature point existing at a position higher than the camera 211 of, for example, a traffic signal, a sign or leaves of a street tree may be excluded. In FIG. 5B, the feature points 324 and 325 among the feature points 322 to 325 are excluded from the road surface feature point candidates. Through the above-described condition determination illustrated in FIGS. 5A and 5B, a feature point that highly possibly exists over the road surface 300 may be narrowed down from among the extracted feature points.

Figure 6:
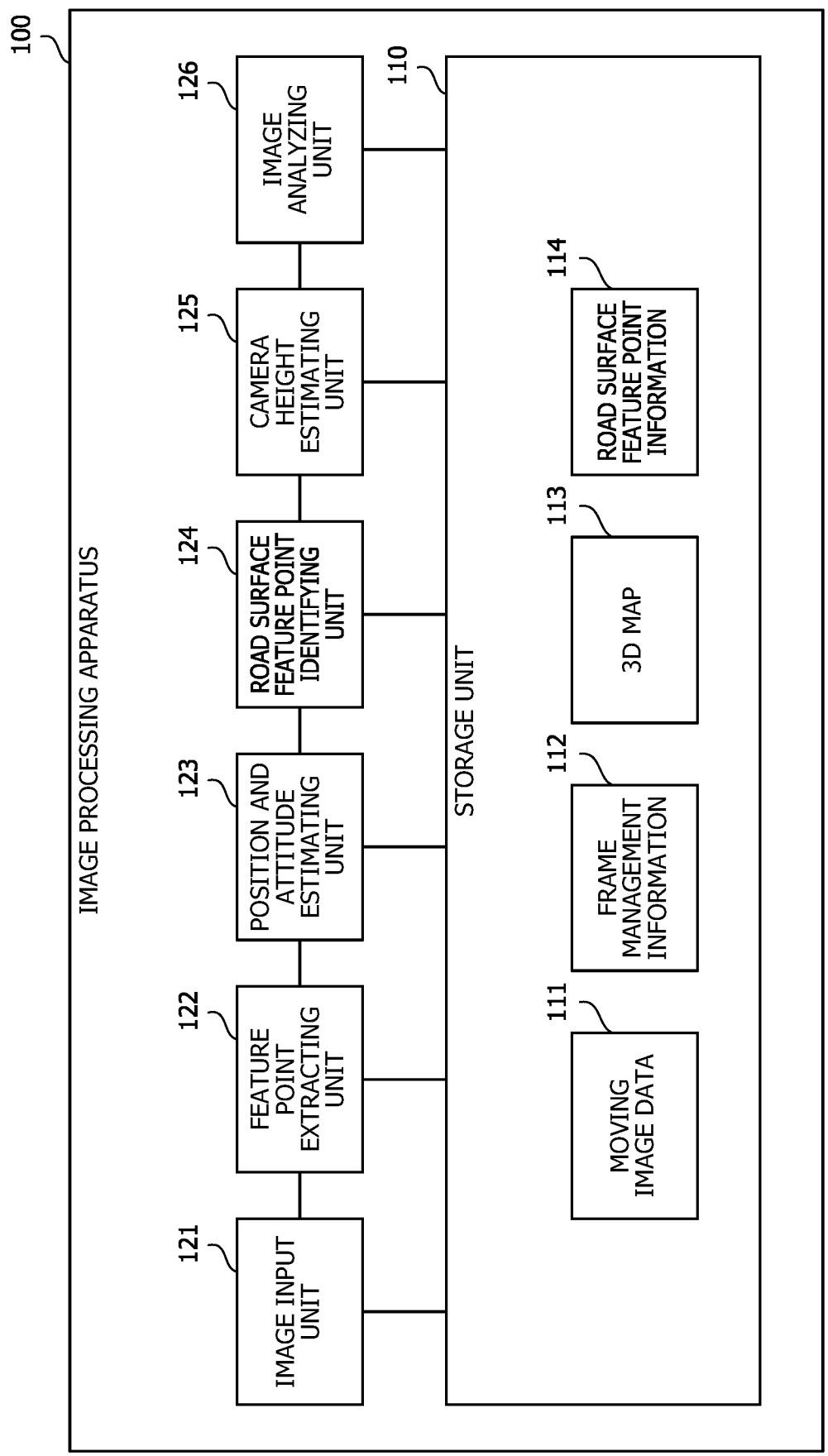
FIG. 6 is a diagram illustrating a configuration example of processing functions that the image processing apparatus includes.

FIG. 6 is a diagram illustrating a configuration example of processing functions that the image processing apparatus includes. As illustrated in FIG. 6, the image processing apparatus 100 includes a storage unit 110, an image input unit 121, a feature point extracting unit 122, a position and attitude estimating unit 123, a road surface feature point identifying unit 124, a camera height estimating unit 125, and an image analyzing unit 126.

The storage unit 110 is implemented, for example, as a storage area of a storage device such as the RAM 102 and the HDD 103 included in the image processing apparatus 100. The storage unit 110 stores moving image data 111, frame management information 112, a three-dimension (3D) map 113, and road surface feature point information 114.

The moving image data 111 is data of a moving image generated by capturing by the camera 211 and transmitted from the driving recorder 210.

The frame management information 112 holds management information on each frame included in the moving image data. With the management information on each frame, vehicle information received from the driving recorder 210, a feature point ID of each feature point extracted from the frame, two-dimensional coordinates of the feature point within the frame, a position and attitude of the camera 211 when capturing the frame, and a calculation result of the height of the camera 211 in the capturing are registered.

With the 3D map 113, three-dimensional coordinates in a relative coordinate system of each feature point are registered. The relative coordinate system is a three-dimensional coordinate system with reference to the position of the camera 211 when capturing the first frame in the moving image data 111.

With the road surface feature point information 114, a feature point ID indicating a road surface feature point identified from among feature points is registered.

The processes by the image input unit 121, the feature point extracting unit 122, the position and attitude estimating unit 123, the road surface feature point identifying unit 124, the camera height estimating unit 125 and the image analyzing unit 126 are implemented by execution of a predetermined program by the processor 101, for example.

The image input unit 121 obtains moving image data and vehicle information on each frame from the driving recorder 210. The image input unit 121 stores the obtained moving image data in the storage unit 110 as the moving image data 111. The image input unit 121 generates a record corresponding to each frame of the moving image data 111 in the frame management information 112 and registers the obtained vehicle information on the frame with the corresponding record in the frame management information 112.

The feature point extracting unit 122 extracts feature points from each frame in the moving image data 111.

The position and attitude estimating unit 123 identifies corresponding feature points between frames and, based on the positions on the frames of the identified feature points and the movement distance of the camera 211 based on the vehicle information corresponding to the frames, estimates a position and attitude of the camera 211 when capturing each frame. The estimated position and attitude indicates the position and attitude of the camera 211 in the relative coordinate system.

The position and attitude estimating unit 123 registers the position and attitude estimated for each frame with the corresponding record in the frame management information 112. The position and attitude estimating unit 123 registers feature point IDs and two-dimensional coordinates on the frame of the extracted feature points with the frame management information 112. In this case, an identical feature point ID is given to corresponding feature points between frames in records corresponding to the frames.

Based on the two-dimensional coordinates on each frame of corresponding feature points between frames, the position and attitude estimating unit 123 calculates three-dimensional coordinates of the feature point in the relative coordinate system. The position and attitude estimating unit 123 registers the calculated three-dimensional coordinates with the 3D map 113 associated with the feature point ID of the feature point.

The road surface feature point identifying unit 124 identifies a road surface feature point estimated as existing over the road surface from among the feature points registered with the 3D map 113. The road surface feature point identifying unit 124 registers the feature point ID indicating the identified road surface feature point with the road surface feature point information 114.

The camera height estimating unit 125 calculates a height of the camera 211 from the road surface 300 for each frame based on the positional relationship in the relative coordinate system between the identified road surface feature point and the camera 211 when capturing the frame. The calculated height is a value in the three-dimensional coordinate system (absolute coordinate system) in a real space in which the camera 211 and the road surface 300 exist.

The image analyzing unit 126 executes an analysis process on a frame by using the calculation result of the height of the camera 211. For example, the image analyzing unit 126 calculates the distance L between an object included in the frame and the position of the camera 211 with respect to the road surface 300, as exemplarily illustrated in FIG. 3. For example, the distance L is calculated based on two-dimensional coordinates or three-dimensional coordinates of a feature point of an object included in a frame and the position and attitude of the camera 211 in addition to the height of the camera 211 corresponding to the frame.

At least a part of the processing functions of the image processing apparatus 100 illustrated in FIG. 6 may be provided in the driving recorder 210.

Figure 7:
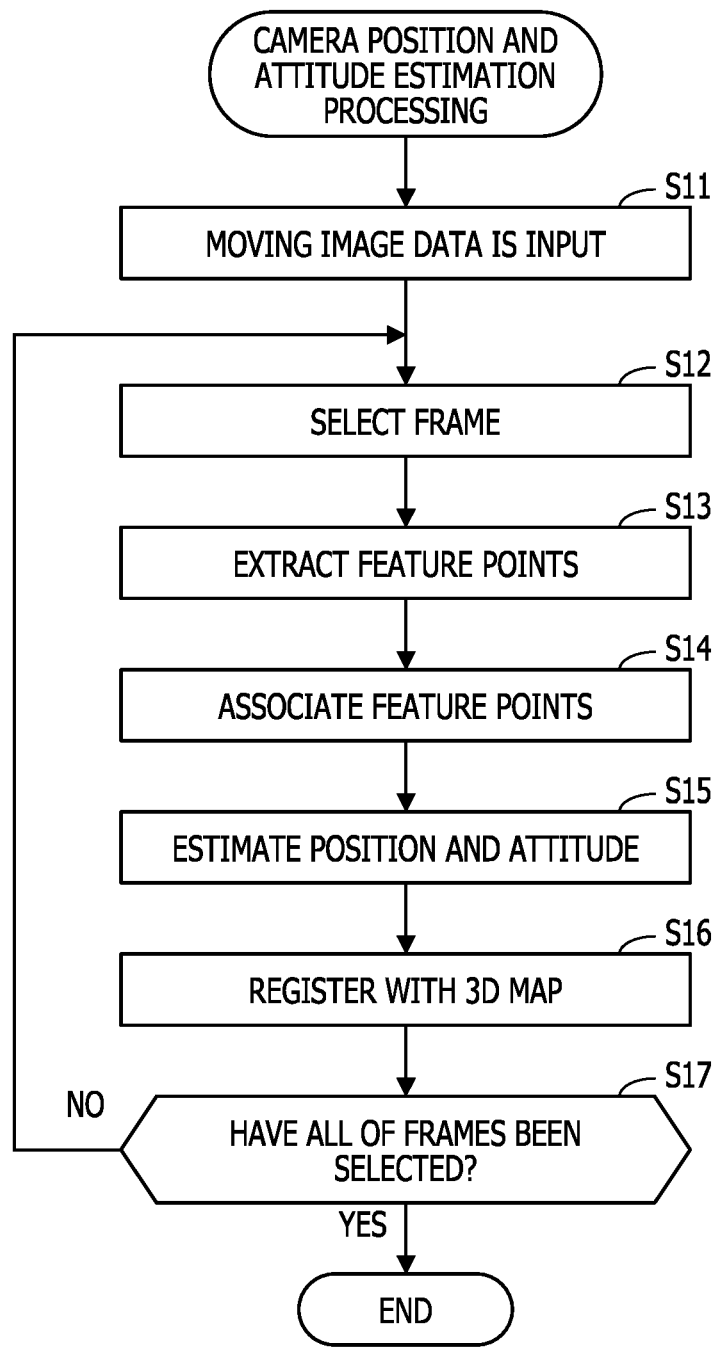
FIG. 7 is an example of a flowchart illustrating camera position and attitude estimation processing.

Processing of the image processing apparatus 100 will now be described by using flowcharts. FIG. 7 is an example of a flowchart illustrating camera position and attitude estimation processing.

[Operation S11] Moving image data and vehicle information on each frame transmitted from the driving recorder 210 are input to the image processing apparatus 100. The image input unit 121 stores the input moving image data in the storage unit 110 as the moving image data 111. The image input unit 121 generates a frame information area corresponding to each frame of the moving image data 111 in the frame management information 112 and registers the obtained vehicle information on the frame with the corresponding frame information area in the frame management information 112.

[Operation S12] The feature point extracting unit 122 selects one of frames included in the moving image data 111. In this selection processing, frames are sequentially selected from the first frame. Hereinafter, the selected frame is called a "current frame".

[Operation S13] The feature point extracting unit 122 extracts feature points from the current frame. The feature points are extracted by using, for example, the corner point detection method by Harris. The feature point extracting unit 122 generates a record corresponding to each of the extracted feature points within a frame information area corresponding to the current frame among the frame information areas generated in the frame management information 112 in operation S11. The feature point extracting unit 122 registers two-dimensional coordinates of each feature point in the current frame with each of the generated records.

When the first frame is selected in operation S12, processing in the following operations S14 to S16 is skipped, and processing in operation S17 is executed.

[Operation S14] The position and attitude estimating unit 123 selects one frame (such as an immediately preceding frame, for example) from among preceding frames each having a frame information area generated in the frame management information 112. Hereinafter, the selected frame is called a "preceding frame". The position and attitude estimating unit 123 associates feature points included in the preceding frame and feature points included in the current frame selected in operation S12.

This association is performed by, for example, matching between surrounding images about a feature point between the frames. For example, a feature point having the highest degree of similarity among feature points on the current frame as a result of the matching with the feature points on the preceding frame is identified as a feature point corresponding to the feature point on the preceding frame. As the matching method, for example, sum of absolute difference (SAD) or sum of squared difference (SSD) may be used. The position and attitude estimating unit 123 assigns a common feature point ID between frames to the feature points associated between the frames and registers the feature point ID with the frame management information 112.

Next, processing in operations S15 and S16 is executed by using SLAM technology.

[Operation S15] The position and attitude estimating unit 123 estimates a position and attitude of the camera 211 when capturing the current frame. In this processing, two-dimensional coordinates on the current frame and the preceding frame of a predetermined or higher number of feature points associated between the current frame and the preceding frame and the movement distance of the camera 211 calculated from the vehicle information corresponding to the current frame and the preceding frame are used. Thus, the three-dimensional coordinates of the camera 211 in the relative coordinate system and information of a yaw, a pitch and a roll indicating an attitude of the camera 211 are calculated.

[Operation S16] Based on the two-dimensional coordinates on each frame of the feature points associated between the current frame and the preceding frame, the position and attitude estimating unit 123 calculates three-dimensional coordinates of the feature points in the relative coordinate system. The position and attitude estimating unit 123 registers the calculated three-dimensional coordinates of each of the feature points with the 3D map 113.

[Operation S17] The position and attitude estimating unit 123 determines whether all of the frames included in the moving image data 111 have been selected as a processing target. If there is an unselected frame, the processing is moved to operation S12 where the first frame of the unselected frames is selected. On the other hand, if all of the frames have been selected, the camera position and attitude estimation processing ends.

Through the processing above, the 3D map 113 acquires a state that three-dimensional coordinates of feature points extracted based on the moving image data 111 are registered. A state that the position and attitude of the camera 211 when capturing the frames are registered with the frame management information 112 is acquired. The positions and attitudes also include the three-dimensional coordinates of the camera 211. Next, by using these kinds of information, camera height calculation processing is executed which calculates a height from the road surface 300 of the camera 211 when capturing each frame.

Figure 8:
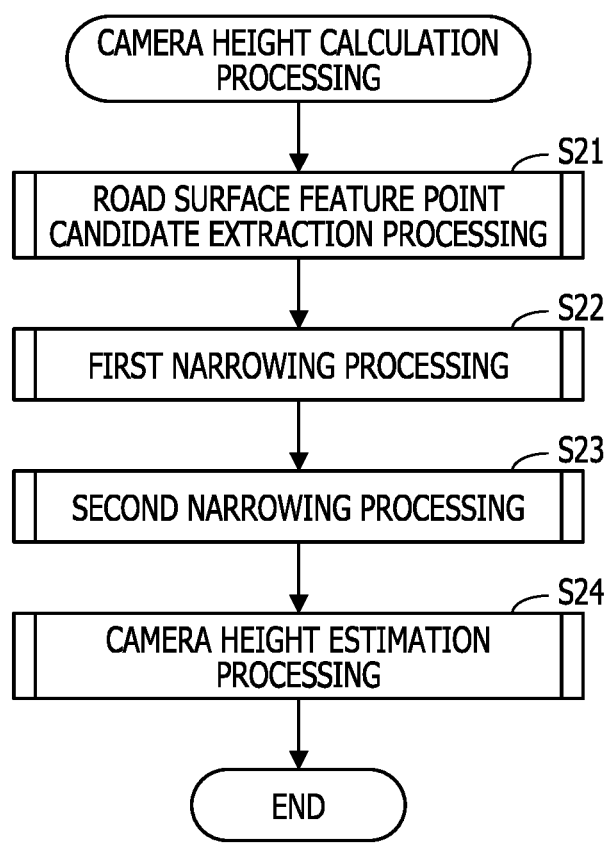
FIG. 8 is an example of a flowchart illustrating camera height calculation processing.

FIG. 8 is an example of a flowchart illustrating camera height calculation processing.

[Operation S21] The road surface feature point identifying unit 124 extracts road surface feature point candidates from the feature points registered with the 3D map 113.

Next, in operations S22 and S23, two kinds of narrowing processing are executed for further narrowing down the extracted road surface feature point candidates.

[Operation S22] The road surface feature point identifying unit 124 executes first narrowing processing which narrows down those satisfying a predetermined narrowing condition from among the road surface feature point candidates extracted in operation S21.

[Operation S23] The road surface feature point identifying unit 124 executes second narrowing processing which narrows down those satisfying a predetermined narrowing condition from among the road surface feature point candidates narrowed down in operation S22. Thus, road surface feature points are identified.

[Operation S24] The camera height estimating unit 125 estimates a height of the camera 211 from the road surface 300 for each frame based on the three-dimensional coordinates of each of the identified road surface feature points and the position and attitude of the camera 211 in the frame.

Figure 9:
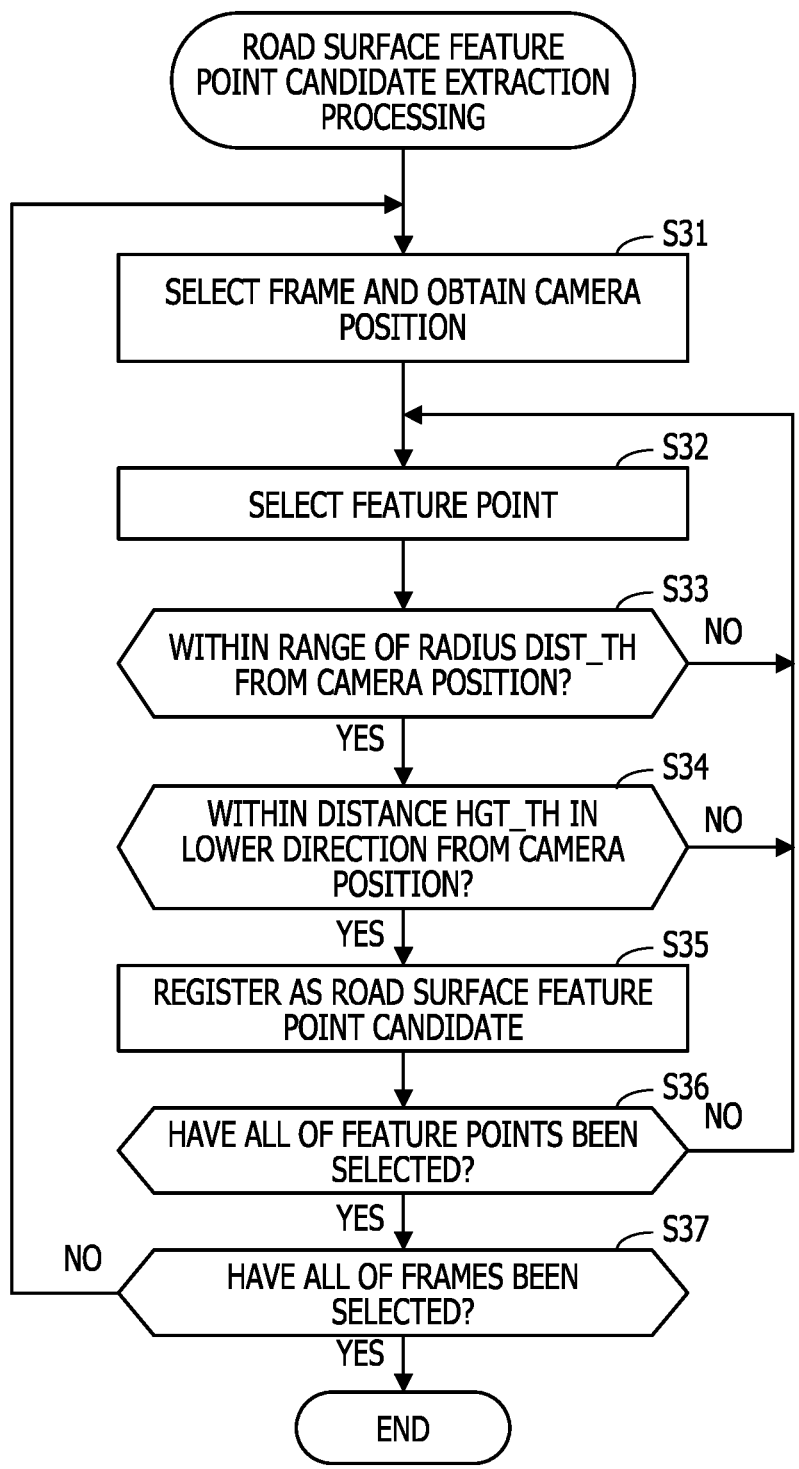
FIG. 9 is an example of a flowchart illustrating road surface feature point candidate extraction processing.

FIG. 9 is an example of a flowchart illustrating road surface feature point candidate extraction processing. The processing of FIG. 9 corresponds to the processing of operation S21 in FIG. 8.

[Operation S31] The road surface feature point identifying unit 124 selects one of frames included in the moving image data 111. The road surface feature point identifying unit 124 obtains three-dimensional coordinates (camera position) of the camera 211 associated with the selected frame from the frame management information 112.

[Operation S32] The road surface feature point identifying unit 124 selects one of feature points included in the selected frame based on the frame management information 112. In this processing, one of feature points that are not registered with the road surface feature point information 114 as road surface feature point candidates at the current time is to be selected.

[Operation S33] The road surface feature point identifying unit 124 obtains the three-dimensional coordinates of the feature point selected in operation S32 from the 3D map 113 and, from the three-dimensional coordinates, identifies a position of the feature point in an XY coordinate system (coordinate system in the horizontal direction in the relative coordinate system). The road surface feature point identifying unit 124 determines whether the identified position of the feature point is included in a range of a radius DIST_TH in the XY coordinate system about the camera position obtained in operation S31. As the radius DIST_TH, a value about 2 m to 3 m is set, for example, by assuming a general width of a road.

If the feature point is included within the range, the processing is moved to operation S34. In this case, the feature point is determined as existing in the predetermined range corresponding to the road surface 300 from the camera position in the XY coordinate system and remains as a road surface feature point candidate. On the other hand, if the feature point is not included within the range, the processing is moved to operation S32 where the next feature point is selected.

[Operation S34] The road surface feature point identifying unit 124 identifies the position of the feature point in a Z axis direction (height direction in the relative coordinate system) from the three-dimensional coordinates of the selected feature point. The road surface feature point identifying unit 124 determines whether the identified position of the feature point is included within a range of a distance HGT_TH in a lower direction (negative direction in the Z axis) from the camera position. As the distance HGT_TH, a value about 0.8 m to 2 m is set, for example, by assuming a general attached height of the driving recorder 210.

If the feature point is included within the range, the processing is moved to operation S35. In this case, the feature point is determined as existing in the predetermined range lower than the camera position in the Z axis direction and remains as a road surface feature point candidate. On the other hand, if the feature point is not included within the range, the processing is moved to operation S32 where the next feature point is selected.

[Operation S35] The road surface feature point identifying unit 124 registers the selected feature point with the road surface feature point information 114 as a road surface feature point candidate.

[Operation S36] The road surface feature point identifying unit 124 determines whether all of the feature points included in the frame selected in operation S31 have been selected as a processing target. If there is an unselected feature point, the processing is moved to operation S32 where one unselected feature point is selected. On the other hand, if all of the feature points have been selected, the processing is moved to operation S37.

[Operation S37] The road surface feature point identifying unit 124 determines whether all of the frames included in the moving image data 111 have been selected as a processing target. If there is an unselected frame, the processing is moved to operation S31 where one unselected frame is selected. On the other hand, if all of the frames have been selected, the road surface feature point candidate extraction processing ends.

Referring to FIG. 9 described above, feature points existing in a predetermined width range about a movement trajectory of the camera 211 are narrowed down as road surface feature point candidates by the determination in operation S33. Feature points existing in a predetermined range lower from the position of the camera 211 are narrowed down as road surface feature point candidates by determination in operation S34.

Figure 10:
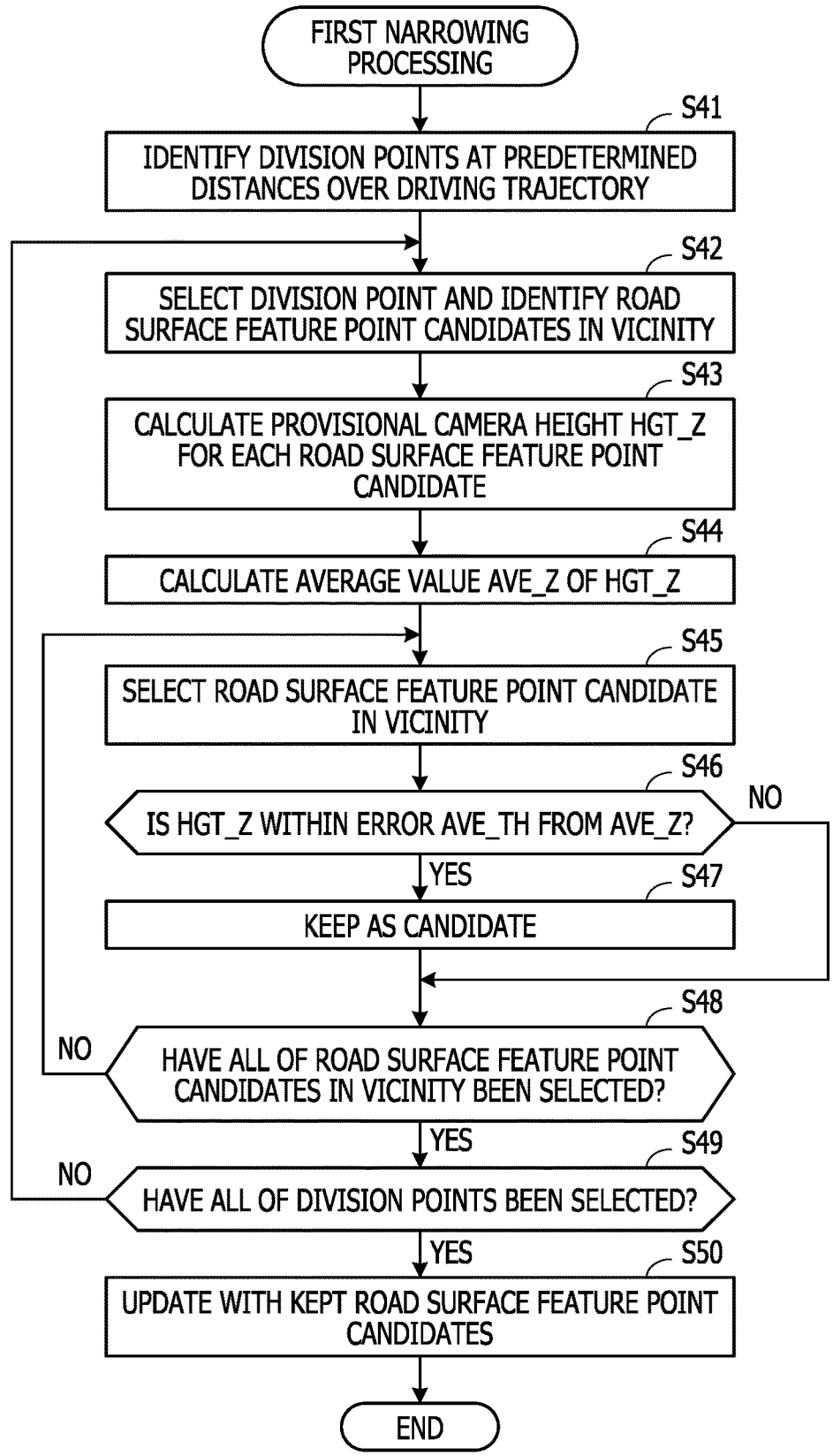
FIG. 10 is an example of a flowchart illustrating first narrowing processing.

FIG. 10 is an example of a flowchart illustrating the first narrowing processing. The processing of FIG. 10 corresponds to the processing of operation S22 in FIG. 8.

[Operation S41] The road surface feature point identifying unit 124 identifies division points at predetermined distances over a driving trajectory of the vehicle. These division points are selected at equal intervals from among the positions of the camera 211 in the frames. Therefore, each of the division points indicates a position of the camera 211 when capturing any one of the frames.

[Operation S42] The road surface feature point identifying unit 124 selects one of the division points. The road surface feature point identifying unit 124 identifies road surface feature point candidates existing in vicinity of the selected division point from among the road surface feature point candidates registered with the road surface feature point information 114. For example, a road surface feature point candidate at a position in the XY coordinate system included in a predetermined range about the division point is identified from among the registered road surface feature point candidates. The predetermined range in front may be, for example, a circular range having a predetermined radius about the division point or a rectangular range having a predetermined length and a predetermined width about the division point.

In operation S42, road surface feature point candidates that are not kept as the candidates in processing in previously executed operations S42 to S48 are also identified as a processing target. This is because the relative positions of feature points being highly possibly road surface feature points depend on the positions of the camera 211 because of tilts and unevenness of the road surface 300.

[Operation S43] The road surface feature point identifying unit 124 calculates a provisional camera height HGT_Z with respect to each of the identified road surface feature point candidates in vicinity. The provisional camera height HGT_Z is a value acquired by subtracting the Z coordinate of the road surface feature point candidate from the Z coordinate of the division point (for example, camera position).

[Operation S44] The road surface feature point identifying unit 124 calculates an average value AVE_Z of the provisional camera heights HGT_Z calculated for the road surface feature point candidates in operation S43.

[Operation S45] The road surface feature point identifying unit 124 selects one of the identified road surface feature point candidates in vicinity.

[Operation S46] The road surface feature point identifying unit 124 determines whether the provisional camera height HGT_Z calculated in operation S43 for the selected road surface feature point candidate is a value within an error AVE_TH from the average value AVE_Z calculated in operation S44. If the condition is satisfied, the processing is moved to operation S47. If the condition is not satisfied, the processing is moved to operation S48.

[Operation S47] The road surface feature point identifying unit 124 keeps the selected road surface feature point candidate as a candidate directly. At this point in time, the registered information in the road surface feature point information 114 is not updated, and the fact that the selected road surface feature point candidate is kept as a candidate is only temporarily recorded.

[Operation S48] The road surface feature point identifying unit 124 determines whether all of the road surface feature point candidates in vicinity which are identified in operation S42 have been selected as a processing target. If there is an unselected road surface feature point candidate, the processing is moved to operation S45 where one unselected road surface feature point candidate is selected. On the other hand, if all of the road surface feature point candidates have been selected, the processing is moved to operation S49.

[Operation S49] The road surface feature point identifying unit 124 determines whether all of the division points have been selected as a processing target. If there is an unselected division point, the processing is moved to operation S42 where one unselected division point is selected. On the other hand, if all of the division points have been selected, the processing is moved to operation S50.

[Operation S50] The road surface feature point identifying unit 124 updates the registered information of the road surface feature point information 114 with all of the road surface feature point candidates kept as candidates in operation S47. For example, those that are not kept as a candidate even once in operation S47 are deleted from the road surface feature point candidates registered with the road surface feature point information 114.

Through the first narrowing processing described above, one having an outlier may be excluded from the road surface feature point candidates. There is a high possibility that heights (provisional camera heights in FIG. 10) from road surface feature point candidates exiting in vicinity of a certain camera position (division point) to the camera position are substantially equal. Therefore, in the first narrowing processing, an average value of the provisional camera heights with respect to road surface feature point candidates is acquired, and one having the provisional camera height apart from the average value by a predetermined or higher amount is excluded from the road surface feature point candidates. As a result, the precision of the identification of road surface feature points may be improved.

Figure 11:
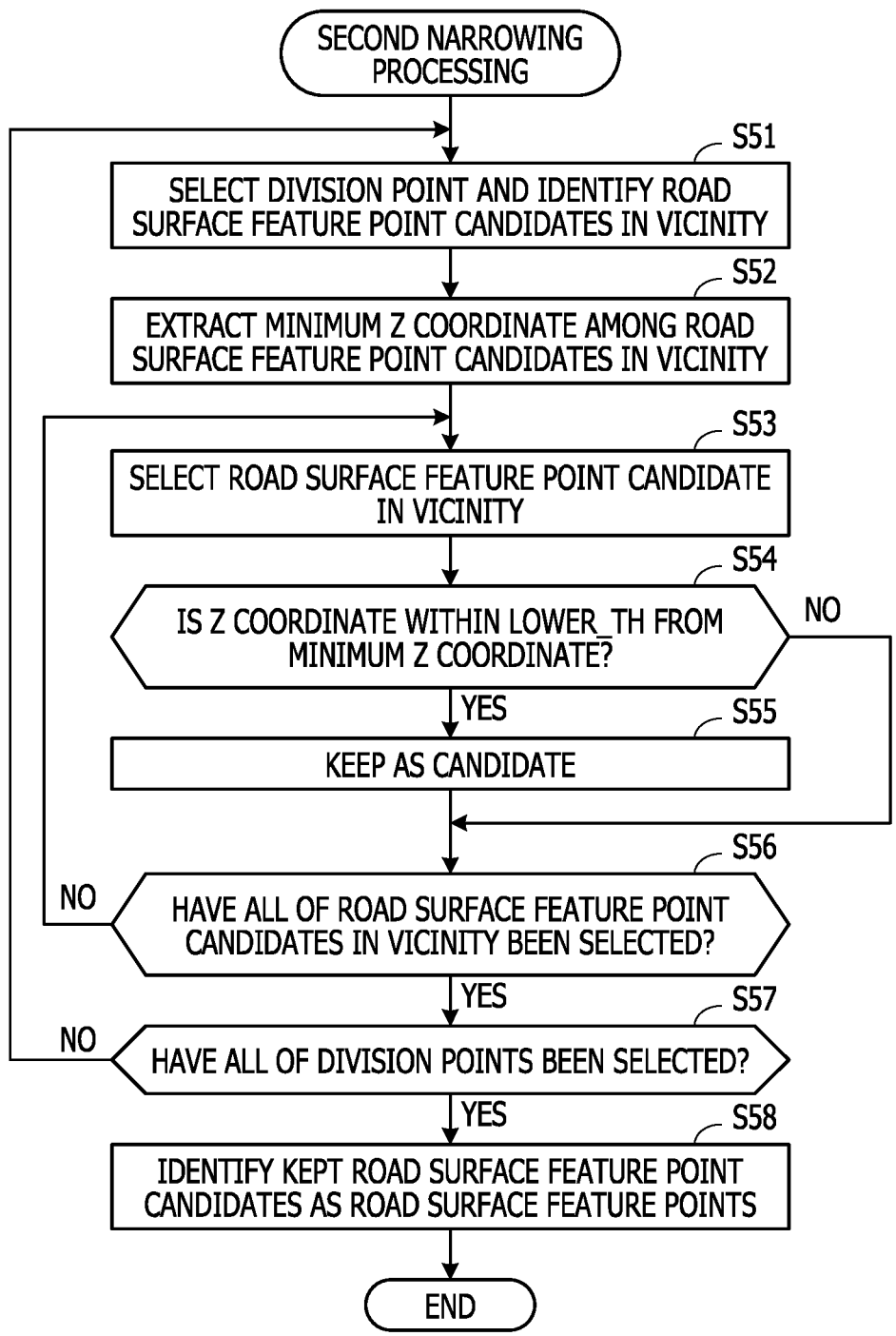
FIG. 11 is an example of a flowchart illustrating second narrowing processing.

FIG. 11 is an example of a flowchart illustrating the second narrowing processing. The processing of FIG. 11 corresponds to the processing of operation S23 in FIG. 8.

[Operation S51] The road surface feature point identifying unit 124 selects one of the division points and identifies road surface feature point candidates in vicinity of the selected division point in the same procedure as operation S42 in FIG. 10.

In operation S51, road surface feature point candidates that are not kept as the candidates in processing in previously executed operations S52 to S56 are also identified as a processing target. This is because the relative positions of feature points being highly possibly road surface feature points depend on the positions of the camera 211 because of tilts and unevenness of the road surface 300.

[Operation S52] The road surface feature point identifying unit 124 acquires the Z coordinate of each of the identified road surface feature point candidates in vicinity and extracts a minimum Z coordinate from among them.

[Operation S53] The road surface feature point identifying unit 124 selects one of the identified road surface feature point candidates in vicinity.

[Operation S54] The road surface feature point identifying unit 124 determines whether the Z coordinate of the selected road surface feature point candidate is a value within a threshold value LOWER_TH from the minimum Z coordinate extracted in operation S52. If this condition is satisfied, the processing is moved to operation S55. If the condition is not satisfied, the processing is moved to operation S56.

[Operation S55] The road surface feature point identifying unit 124 keeps the selected road surface feature point candidate as a candidate directly. At this point in time, the registered information in the road surface feature point information 114 is not updated, and the fact that the selected road surface feature point candidate is kept as a candidate is only temporarily recorded.

[Operation S56] The road surface feature point identifying unit 124 determines whether all of the road surface feature point candidates in vicinity which are identified in operation S51 have been selected as a processing target. If there is an unselected road surface feature point candidate, the processing is moved to operation S53 where one unselected road surface feature point candidate is selected. On the other hand, if all of the road surface feature point candidates have been selected, the processing is moved to operation S57.

[Operation S57] The road surface feature point identifying unit 124 determines whether all of the division points have been selected as a processing target. If there is an unselected division point, the processing is moved to operation S51 where one unselected division point is selected. On the other hand, if all of the division points have been selected, the processing is moved to operation S58.

[Operation S58] The road surface feature point identifying unit 124 identifies all of the road surface feature point candidates kept as candidates in operation S55 as final road surface feature points. In this case, those that are not kept as a candidate even once in operation S55 are deleted from the road surface feature point candidates registered with the road surface feature point information 114.

Through the second narrowing processing described above, a feature point that exists at a position relatively near the road surface 300 but not over the road surface 300, such as shrubbery on a side of the road, for example, may be excluded from the road surface feature point candidates. It may be considered that a road surface feature point is positioned on a lower side than feature points that are not over the road surface 300, except for those clearly having outliers. Therefore, in the second narrowing processing, from road surface feature point candidates existing in vicinity of the camera position (division point), one having a height (Z coordinate) within a predetermined range from a minimum value thereof is kept as a road surface feature point candidate. As a result, the precision of the identification of road surface feature points may be improved.

Figure 12:
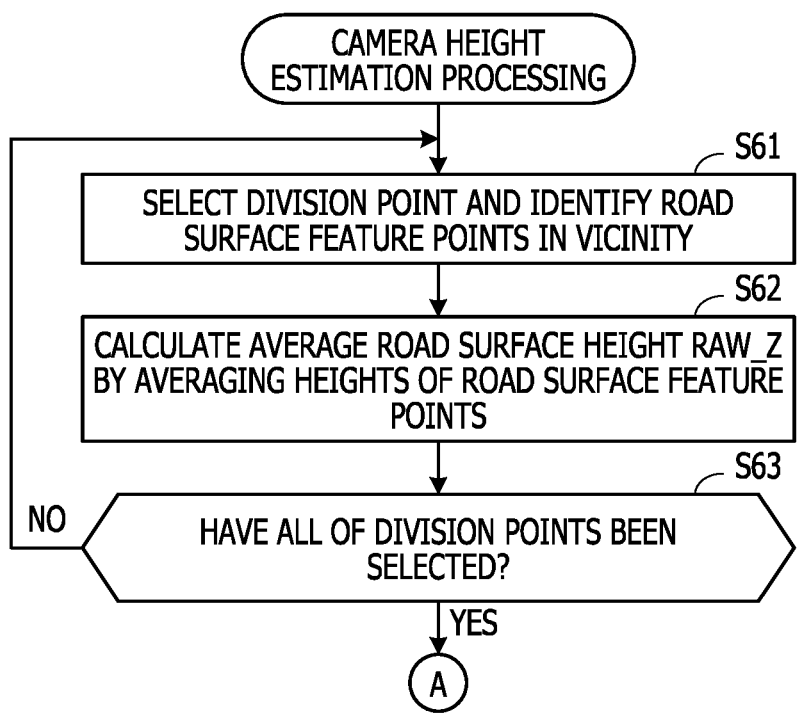
FIG. 12 is an example of a flowchart (1) illustrating camera height estimation processing.
Figure 13:
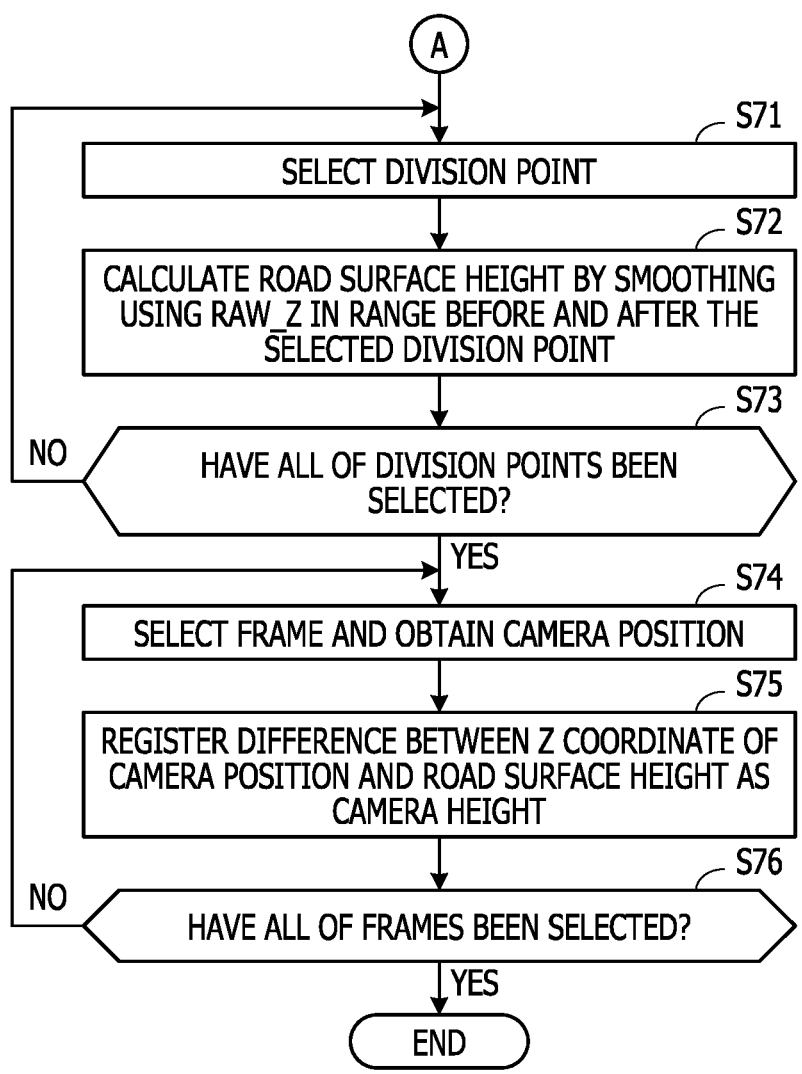
FIG. 13 is an example of a flowchart (2) illustrating the camera height estimation processing.

FIGS. 12 and 13 are an example of a flowchart illustrating camera height estimation processing. The processing of FIGS. 12 and 13 corresponds to the processing of operation S24 in FIG. 8.

[Operation S61] The camera height estimating unit 125 selects one of the division points and identifies road surface feature point candidates in vicinity of the selected division point in the same procedure as operation S42 in FIG. 10.

[Operation S62] The camera height estimating unit 125 calculates an average road surface height RAW_Z by averaging heights (Z coordinate) of the identified road surface feature point candidates. The calculated average road surface height RAW_Z is temporarily stored in association with the selected division point.

[Operation S63] The camera height estimating unit 125 determines whether all of the division points have been selected as a processing target. If there is an unselected division point, the processing is moved to operation S61 where one unselected division point is selected. On the other hand, if all of the division points have been selected, the processing is moved to operation S71 in FIG. 13.

The description continues below by using FIG. 13.

[Operation S71] The camera height estimating unit 125 selects one division point.

[Operation S72] The camera height estimating unit 125 performs smoothing by linear regression by using the average road surface height RAW_Z associated with the selected division point and the average road surface heights RAW_Z associated with division points included in predetermined ranges before and after the selected division point. Thus, a height of the road surface 300 immediately below the division point in the relative coordinate system is calculated.

[Operation S73] The camera height estimating unit 125 determines whether all of the division points have been selected as a processing target. If there is an unselected division point, the processing is moved to operation S71 where one unselected division point is selected. On the other hand, if all of the division points have been selected, the processing is moved to operation S74.

[Operation S74] The camera height estimating unit 125 selects one of frames included in the moving image data 111 and acquires three-dimensional coordinates (camera position) of the camera 211 associated with the selected frame.

[Operation S75] The camera height estimating unit 125 registers a difference between the Z coordinate of the acquired camera position and the road surface height corresponding to the camera position with the frame management information 112 as a height of the camera 211 when capturing the selected frame. If the camera position corresponds to one of the division points, the height of the road surface 300 calculated in operation S72 with respect to the division point is used as the road surface height. On the other hand, if the camera position corresponds to none of the division points, a division point positioned immediately before or after the camera position is selected, and the height of the road surface 300 immediately below the camera position is interpolated by using the linear regression acquired in the operation S72 with respect to the division point. The result of the interpolation is used as the road surface height.

[Operation S76] The camera height estimating unit 125 determines whether all of the frames included in the moving image data 111 have been selected as a processing target. If there is an unselected frame, the processing is moved to operation S74 where one unselected frame is selected. On the other hand, if all of the frames have been selected, the camera height estimation processing ends.

In the processing in FIGS. 12 and 13, a height of the camera in each frame when capturing the frame is calculated instead of the camera height over the entire driving trajectory. This is because there is a possibility that the road surface 300 has a tilt or unevenness and the road surface 300 may not keep an equal height over the entire driving trajectory. Since the coordinates used in FIGS. 12 and 13 are coordinates in the relative coordinate system, the calculated height of the road surface 300 is also a relative value from the camera position. For that, in the processing above, a camera height in an absolute coordinate system is calculated by calculating a difference between the camera position and the nearest road surface 300 to the camera position (road surface 300 immediately below the camera position in the Z direction). However, by using not only the height of the road surface 300 immediately below the camera position but also the smoothed height of the road surface 300 in a predetermined range therebefore and thereafter, deterioration of the precision of calculation of the camera height may be suppressed even when the road surface 300 has a tilt or unevenness.

Modification Example of Second Embodiment

A modification example in which part of processing of the image processing apparatus 100 according to the second embodiment is modified will be described below.

According to the second embodiment, a road surface feature point is identified from among feature points based on relative positions of the camera 211 and the feature points in the relative coordinate system. On the other hand, by applying an image recognition technology based on semantic segmentation, an area of the road surface 300 may be recognized from a captured image, and feature points included in the area may be identified as road surface feature points.

Figure 14:
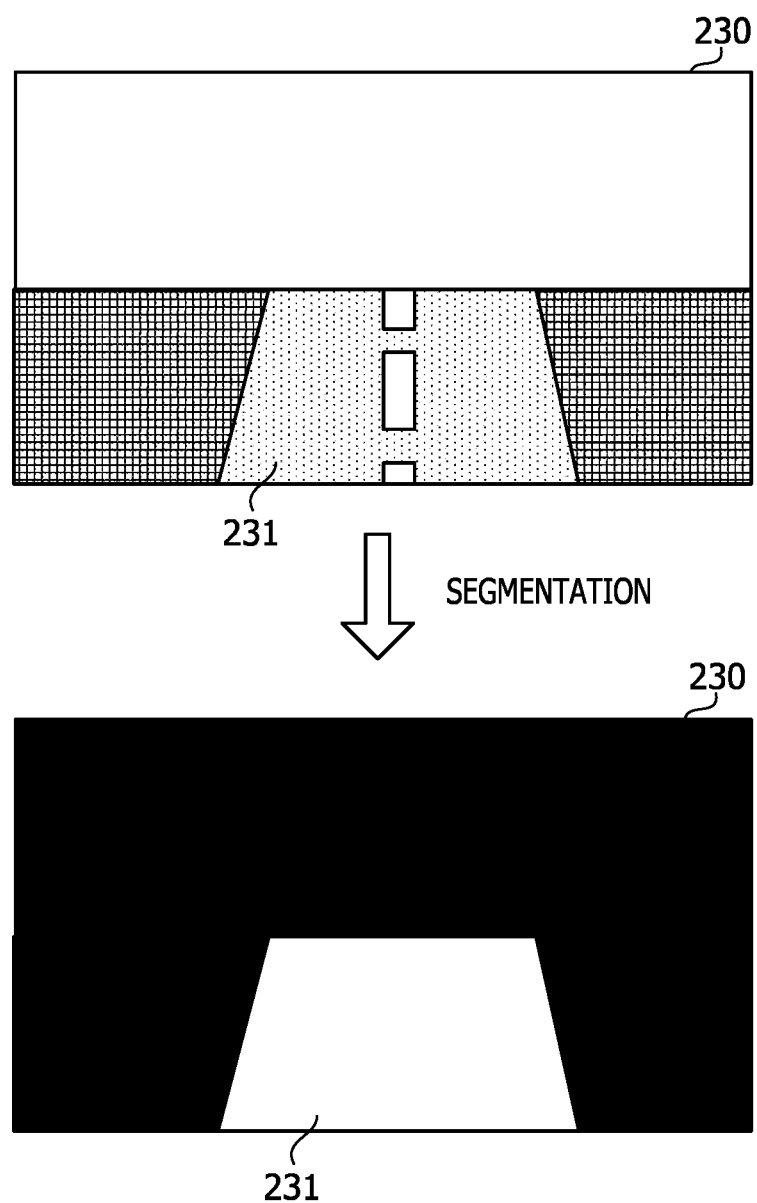
FIG. 14 is a diagram illustrating an example of processing for recognizing a road surface area by semantic segmentation.

FIG. 14 is a diagram illustrating an example of processing for recognizing a road surface area by semantic segmentation. An image 230 illustrated on the upper side of FIG. 14 is an example of an image captured by the camera 211 and includes a roadway area 231. In semantic segmentation, the image 230 is divided into a plurality of segments and whether each of the segments includes a roadway is determined by using a model having learned images of roadways in advance. Thus, the roadway area 231 is extracted from the image 230 as illustrated on the lower side of FIG. 14. Therefore, feature points included in the roadway area 231 among the feature points included in the image 230 may be identified as road surface feature points.

FIG. 15 is an example of a flowchart illustrating road surface feature point candidate extraction processing according to the modification example. In this modification example, processing in FIG. 15 is executed instead of operations S21 to S23 illustrated in FIG. 8.

[Operation S81] The road surface feature point identifying unit 124 selects one of frames included in the moving image data 111.

[Operation S82] The road surface feature point identifying unit 124 extracts a roadway area by semantic segmentation from the selected frame.

[Operation S83] The road surface feature point identifying unit 124 selects one of feature points included in the selected frame based on the frame management information 112.

[Operation S84] Based on a two-dimensional coordinates area of the extracted roadway area and two-dimensional coordinates of the selected feature point, the road surface feature point identifying unit 124 determines whether the position of the feature point is included in the roadway area. If the feature point is included in the roadway area, the processing is moved to operation S85. If the feature point is not included in the roadway area, the processing is moved to operation S86.

[Operation S85] The road surface feature point identifying unit 124 registers the selected feature point with the road surface feature point information 114 as a road surface feature point.

[Operation S86] The road surface feature point identifying unit 124 determines whether all of the feature points included in the selected frame have been selected as a processing target. If there is an unselected feature point, the processing is moved to operation S83 where one unselected feature point is selected. On the other hand, if all of the feature points have been selected, the processing is moved to operation S87.

[Operation S87] The road surface feature point identifying unit 124 determines whether all of the frames included in the moving image data 111 have been selected as a processing target. If there is an unselected frame, the processing is moved to operation S81 where one unselected frame is selected. On the other hand, if all of the frames have been selected, the road surface feature point extraction processing ends.

Through the processing above, a road surface feature point may be identified with high precision from among extracted feature points.

The processing functions of the apparatuses (for example, the image processing apparatuses 1 and 100) illustrated in each of the above embodiments may be implemented by a computer. In such a case, there is provided a program describing processing details of functions to be included in each apparatus, and the computer executes the program to implement the aforementioned processing functions in the computer. The program describing the processing details may be recorded on a computer-readable recording medium. The computer-readable recording medium includes a magnetic storage device, an optical disc, a magneto-optical recording medium, a semiconductor memory, and the like. The magnetic storage device includes a hard disk drive (HDD), a magnetic tape, and the like. The optical disc includes a compact disc (CD), a digital versatile disc (DVD), a Blu-ray disc (BD, registered trademark), and the like. The magneto-optical recording medium includes a magneto-optical (MO) disk and the like.

In order to distribute the program, for example, portable recording media, such as DVDs and CDs, on which the program is recorded are sold. The program may also be stored in a storage device of a server computer and be transferred from the server computer to other computers via a network.

The computer that executes the program, for example, stores the program recorded on the portable recording medium or the program transferred from the server computer in its own storage device. The computer reads the program from its own storage device and performs processing according to the program. The computer may also directly read the program from the portable recording medium and perform processing according to the program. The computer may also sequentially perform processes according to the received program each time the program is transferred from the server computer coupled to the computer via the network.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A camera height calculation method that causes a computer to execute a process, the process comprising:
    obtaining one or more images captured by an in-vehicle camera;
    extracting one or more feature points from the one or more images;
    identifying first feature points that exist over a road surface from the one or more feature points;
    calculating a height of the in-vehicle camera from the road surface, based on positions of the identified first feature points; and
    calculating a distance between an object and the in-vehicle camera based on the calculated height of the in-vehicle camera.

2. The camera height calculation method according to claim 1,
    wherein the first feature points are included in a predetermined first range with reference to the in-vehicle camera, based on three-dimensional coordinates of the one or more feature points and the in-vehicle camera.

3. The camera height calculation method according to claim 2,
    wherein the first feature points are included in a second range in a horizontal direction about the in-vehicle camera and included in a third range in a lower direction from a height of the in-vehicle camera in a three-dimensional coordinate system with reference to the in-vehicle camera.

4. The camera height calculation method according to claim 1, wherein:
    the one or more images are acquired by one or more image-capturing operations in response to a movement of the in-vehicle camera,
    the one or more feature points are extracted from the one or more images, and
    the identifying of the first feature points includes:
        identifying one or more first candidates of the first feature points from the first feature points included in a fourth range with reference to each of the one or more image-capturing positions, based on three-dimensional coordinates indicating the one or more image-capturing positions and three-dimensional coordinates of the one or more feature points in a three-dimensional coordinate system with reference to the in-vehicle camera;

extracting, for each of the one or more image-capturing positions, one or more second candidates of the first feature points included in a fifth range about the one image-capturing position from the first candidates, calculating, for each of the second candidates, a first distance from the one or more image-capturing positions in a vertical direction in the three-dimensional coordinate system, calculating an average value of first distances calculated for each the second candidates, and narrowing down, as the first feature points, the first candidates having the first distances included in a sixth range from the average value, from the second candidates.

5. The camera height calculation method according to claim 4, wherein the identifying of the first feature points further includes:

extracting, for each of the one or more image-capturing positions, second feature points included in the fifth range about the image-capturing position from the first feature points by the narrowing down of the first candidates, identifying a minimum value of a first coordinate in the vertical direction of the second feature point, and narrowing down, from the second feature points, the first feature points having the first coordinates included in a seventh range from the minimum value.

6. The camera height calculation method according to claim 1, wherein the identifying of the first feature points:

identifies an area of the road surface by image recognition of the obtained one or more images, and identifies the first feature points from the one or more feature points included in the identified area of the road surface.

7. The camera height calculation method according to claim 1, wherein the calculating of the height calculates the height based on relative positions in a three-dimensional coordinate system of the first feature point and the in-vehicle camera.

8. The camera height calculation method according to claim 1, wherein:

the one or more images are acquired by one or more image-capturing operations in response to a movement of the in-vehicle camera, and the calculating of the height for each of image-capturing positions of the one or more images, smooths coordinates in a vertical direction of third feature points included in an eighth range about the image-capturing position among the first feature points in a three-dimensional coordinate system with reference to the in-vehicle camera, and calculates the height from a difference between the smoothed coordinate and the coordinate in the vertical direction of the image-capturing position.

9. An image processing apparatus comprising:

a memory; and a processor coupled to the memory and configured to:

obtain one or more images captured by an in-vehicle camera;

extract one or more feature points from the one or more images;

identify first feature points that exist over a road surface from the one or more feature points;

calculate a height of the in-vehicle camera from the road surface, based on positions of the identified first feature points; and calculate a distance between an object and the in-vehicle camera based on the calculated height of the in-vehicle camera.

* * * * *